United States Patent [19]

Soloski et al.

[11] Patent Number: 4,829,162

[45] Date of Patent: May 9, 1989

[54] MAINTENANCE OF UNIFORM OPTICAL WINDOW PROPERTIES

[75] Inventors: Steven C. Soloski; Lowell M. Hobrock, both of Los Angeles, Calif.

[73] Assignee: Hughes Aircraft Co., Los Angeles, Calif.

[21] Appl. No.: 812,864

[22] Filed: Dec. 23, 1985

[51] Int. Cl.[4] ........................ H05B 3/06; B64D 15/00; B24B 23/00

[52] U.S. Cl. .................................... 219/522; 219/200; 219/201; 219/203; 219/219; 219/483; 219/486; 219/543; 219/547; 244/134 D; 244/134 E; 52/171

[58] Field of Search ............... 219/200, 201, 203, 219, 219/522, 543, 545, 483, 486; 52/170, 171; 250/203 R; 356/141; 244/134 D, 134 E

[56] References Cited

U.S. PATENT DOCUMENTS

| | | | |
|---|---|---|---|
| 3,982,092 | 9/1976 | Marriott | 219/203 |
| 4,036,457 | 7/1977 | Volhner et al. | 244/134 D |
| 4,039,246 | 8/1977 | Voight | 350/7 |
| 4,346,286 | 8/1982 | Romp | 219/501 |
| 4,443,691 | 4/1984 | Sauer | 219/522 |

*Primary Examiner*—E. A. Goldberg
*Assistant Examiner*—Gerald E. Preston
*Attorney, Agent, or Firm*—W. J. Streeter; A. W. Karambelas

[57] ABSTRACT

Uniform electrical heating of a circular, single crystal germanium window (18) uses its bulk resistance and pairs of electrodes (20) equally spaced about the window's periphery. The electrode pairs are sequentially switched at a rate high enough to avoid thermal switching transients.

12 Claims, 4 Drawing Sheets

MAINTENANCE OF UNIFORM OPTICAL WINDOW PROPERTIES

BACKGROUND OF THE INVENTION

1. Field of the Invention

The present invention relates to the maintenance of uniform optical properties in transmissive and reflective devices and, more particularly, to maintaining such properties for establishing a predetermined thermal pattern throughout such devices.

2. Description of Related Art and Other Considerations

In order to operate properly, such optical devices as windows and reflectors must be free from substantial distortion, which may be caused by non-uniform or other undesired thermal distributions in the optical device, or by the formation of ice thereon.

Such icing may occur from flight through an icing cloud or on the ground or from rapid thermal transients in-flight. A cover of ice over the window will blind the optical viewing, such as in a forward-looking infrared (FLIR) system, while ice on a viewing turret in which the window, e.g., of germanium, is mounted, can restrict the full range of motion. Protection against these conditions is provided by resistive heating of the germanium window substrate and a heater strip around the azimuth gimbal/base interface of the turret. This design provides for full panoramic viewing with the FLIR.

Historically, anti-icing has been implemented and/or studied for many systems. In one sight a conductive coating was used to heat the visible window. In another, two different heated windows were employed, one using a metallized coating and the other a hot air system similar to a thermopane.

A further system utilized a large rectangular window made of polycrystalline germanium. That window was electrically heated using the bulk resistance of the semiconductor material. However, two major problems with resistively heating polycrystalline germanium are accelerated corrosion by preferential etching and non-uniform heating. When the anti-reflection coating on the substrate contains pin holes, moisture together with dissolved carbon dioxide and oxygen can penetrate to the substrate. If pin holes are near grain boundaries, corrosion will result when voltage is applied to the window. Corrosion is greatly accelerated in the presence of 2 micron radiation and an ultimate failure of the window will occur by crazing. Accordingly, such windows must be regularly inspected, and removed from service as required. Those windows can then be repolished, recoated, and returned to service. Alternatively, because these problems are caused by grain boundaries in the polycrystalline material, they can be avoided by using single crystal material.

Based upon this and other experience, various requirements are placed upon the design of the window, such as by environmental specifications, existing hardware, and the end use for which the window and viewing system are intended, as defined by a particular program.

Icing specifications take two different forms: climatic and equipment. Climatic requirements describe the meterological conditions under which icing may occur and the extent of the condition. For example, icing generally occurs at altitudes from sea level to 22,000 feet and ambient temperatures from −4° F. to 32° F. A "moderate" condition is one in which ½ inch of ice can accumulate on a small probe in 20 miles.

Hardware specifications expand upon the environmental conditions and also require specific design criteria. Thus, for many end-use requirements of the window, only thermal anti-icing may be considered and heated surfaces shall be running wet with a temperature above 35° F. in a 0° F. environment. In addition, the aircraft speed shall be at a maximum. Using the various specifications, a heating requirement of 3.9 watts/sq. in, for an examplary design, may be arrived at.

Other requirements are established by the program. Aircraft subjected to the less severe "trace" icing condition need not be protected. Also, an icing condition and the anti-icing equipment to mitigate that condition can have an impact on performance. It is therefore reasonable to require that the anti-ice system have no influence on performance during non-operational periods. When operating, the anti-icing equipment shall only cause "minor" degradation to system performance.

Regarding ground icing, the sight generally is cleared in the same manner as in the rest of the aircraft.

For a particular turret, in designing a minimum drag turret with a full azimuth field of regard, a spherical turret was faired into a cylindrical base section. To maintain the lowest aerodynamic turret torques, it was necessary to minimize the area of all flat surfaces. Thus, except for a spherical window, which has optical power, a circular window sized as close as possible to the extent of the incoming ray bundle is desirable. Since the concern was with a low speed aircraft, aerodynamic heating was not a significant consideration, and germanium was chosen for the window material as having superior optical performance.

In an anti-iced design, it is necessary to consider optical degradation both during periods when the de-icing implementation is and is not energized. A conductive edge heater induces large radial temperature gradients into a window, and the gradients affect the quality of the imagery. This is particularly true with germanium due to its relatively large change of index of refraction with temperature (dn/dT). Combined with the coefficient of thermal expansion of the material, the gradients will yield a variable but weak lens. Since the window is tilted to control narcissus, this "weak lens" will introduce astigmatism into the system.

Another approach to an electrically heated window utilizes surface heating by a conductive coating or deposited (or embedded) elements. Such a window, whether through obscuration or transmission losses, will lower the incoming signal. In addition, any hot spots caused by the heater elements will introduce noise (albeit out of focus) into the system.

A third alternative employs indirect electrical heating with a thermopane. In such a system hot air is passed between two window panes and heats the outer pane by convection. Such a scheme is usable on a visible (or near visible) system using a window of glass due to the negligible change of index of refraction with temperature and low coefficient of thermal expansion. Such a configuration will have significant temperature gradients in the direction of flow and non-uniform gradients perpendicular due to the circular shape. For glass windows, these gradients do not pose a problem. However, in windows of such a semiconductive material as germanium, these gradients, when combined, with the large dn/dT of the semiconductor material, will degrade the imagery.

A window fabricated from germanium is both electrically and thermally conductive. Thus, anti-icing has been provided directly by resistive heating of the bulk material. Such a scheme will have no impact on the system performance when not energized and is chosen to minimize degradation during operation.

Germanium, a semiconductor, can be electrically heated by simply passing a current through it. However, its resistivity can decrease dramatically as temperature increases due to thermal excitation of free carriers which results in an increase in the infrared optical absorption. Thus, a thermal control system must be provided to prevent thermal runaway. The index of refraction is also highly temperature dependent. Therefore, uniform heating is required to minimize optical degradation.

Normally, resistively heated germanium windows are of a rectangular design and constant thickness so that the heating essentially is uniform. A typical example is the previously described rectangular window of polycrystalline germanium.

For non-rectangular windows, e.g., circular windows, which are resistively heated, the equipotential lines are not linear. Thus, the electric field lines and, consequently, the paths of constant current, are elliptical. This results in a very non-uniform heating pattern because the power dissipation as given by potential field theory is related to the size of the equipotential/constant current squares.

Similar problems are encountered in optical distortions in high power laser system components. Present solutions include high pressure and high flow rates of a coolant past the optical components.

SUMMARY OF THE INVENTION

The present invention overcomes these and other problems by providing heating of an optically transmissive or reflective device in a predetermined thermal pattern. This heating may be a periodic heating of selected points on the device in accordance with the predetermined thermal pattern. When it is desired that there be uniform heating, the non-uniform thermal distribution across the device is conformed into a generally uniform heating in accordance with the uniform thermal pattern.

In the preferred embodiment relating to heating a single crystal semiconductive window device, sequential heating with distributed multiple electrodes, using the bulk resistivity of the material, results in uniform heating, thus maintaining the window's optical properties. Specifically, to control the non-uniformity in heating and thereby the temperature gradients within the window, the electrodes are paired and are equally spaced around the circumference of the window and electric current is alternated among the electrodes, generally in a rotational manner. Accompanying switching circuitry rotates the applied voltage at a frequency which is large compared to the thermal response time of the window, thereby minimizing thermal gradients.

For eliminating optical distortion of components in high power laser systems, the optical components are heated in an appropriate distribution so that the nonuniform heating distribution is conformed to a uniform distribution.

Several advantages are derived therefrom. Primarily, any non-uniform thermal distribution of an optically transmissive or reflective device can be heated in any desired manner so as to achieve the desired optical end results, regardless of the shape or configuration of the optical device, whether peripherally different or having a variable cross-sectional thickness. Thus, optical degradation of such devices is avoidable.

Other aims and advantages as well as a more complete understanding of the present invention will appear from the following explanation of exemplary embodiments and the accompanying drawings thereof.

DESCRIPTION OF THE PREFERRED EMBODIMENTS

Figure 1:
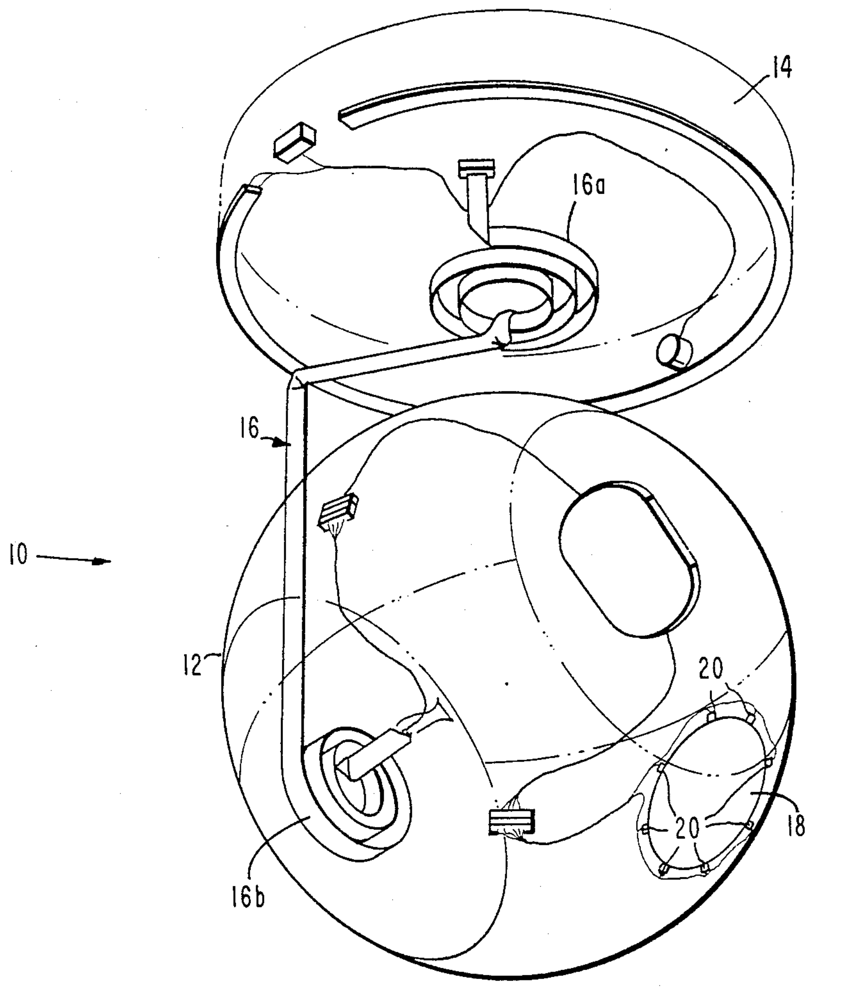
FIG. 1 is a schematic view of the major components of an anti-ice system, showing the environment in which the invention is useful, and the preferred arrangement of electrode pairs equally spaced about the circumference of a semiconductor window.

Accordingly, FIG. 1 illustrates a turret 10 which comprises a portion of an optical system, such as a FLIR (forward looking infrared system). Turret 10 includes a generally spherical turret housing 12 which is secured to a base 14. The base is affixed, for example, to an aircraft. Turret housing 12 is adapted to rotate through substantially 360° about an axis normal to base 14 and approximately 270° in any plane perpendicular to the plane of the base. Thus, the turret has a substantially full azimuth field of regard or view. To permit electrical connection with such pivoting, a conventional electrical cable 16 with coils **16*a* and 16*b* joins housing 12 and its electrical components to the base. To enable optical signals to be received within housing 12, a window 18 is positioned generally on its periphery. For infrared viewing, the preferred material of window 18 is germanium. It is through window 18 that infrared radiation is received within the system. It is, therefore, desired that housing 12 can pivot in any direction with respect to base 14 so that window 18** may be directed in almost a 360° spherical direction.

Such a window 18 is preferrably of circular shape, as explained previously, so as to be sized as close as possible to the extent of the incoming ray or radiation bundle. Further, because of its circular configuration, such a window will exhibit non-uniform heat loss, which results in non-uniform temperature or temperature gradients within the window, when heated in a conventional manner. As contrasted to a window of rectangular design, the gradients between electrodes placed at opposite edges is uniform. In a circular window, however, the gradients do not proceed across the window uniformly but expand toward the center and then decrease as they approach the opposite electrode. Because germanium, in particular, has a high index of refraction and a high change of refractive index with a change in temperature, non-uniform heating of the window will cause severe optical distortion. Therefore, to control the nonuniformity in heating and, therefore, the temperature gradients within the window, a series of electrodes 20 are equally spaced about the circumference of window 18. To evenly distribute the heat thereby generated, the electrodes are energized in a periodic manner by alternating the electric current thereto. Such energization includes an alternating of the electric current among the electrodes by a switching circuitry. While various alternating voltage patterns may be tailored to any specific window, it is preferred to rotate the applied voltage at a frequency that is large compared to the thermal response time of the window, thereby minimizing thermal gradients.

Figure 2:
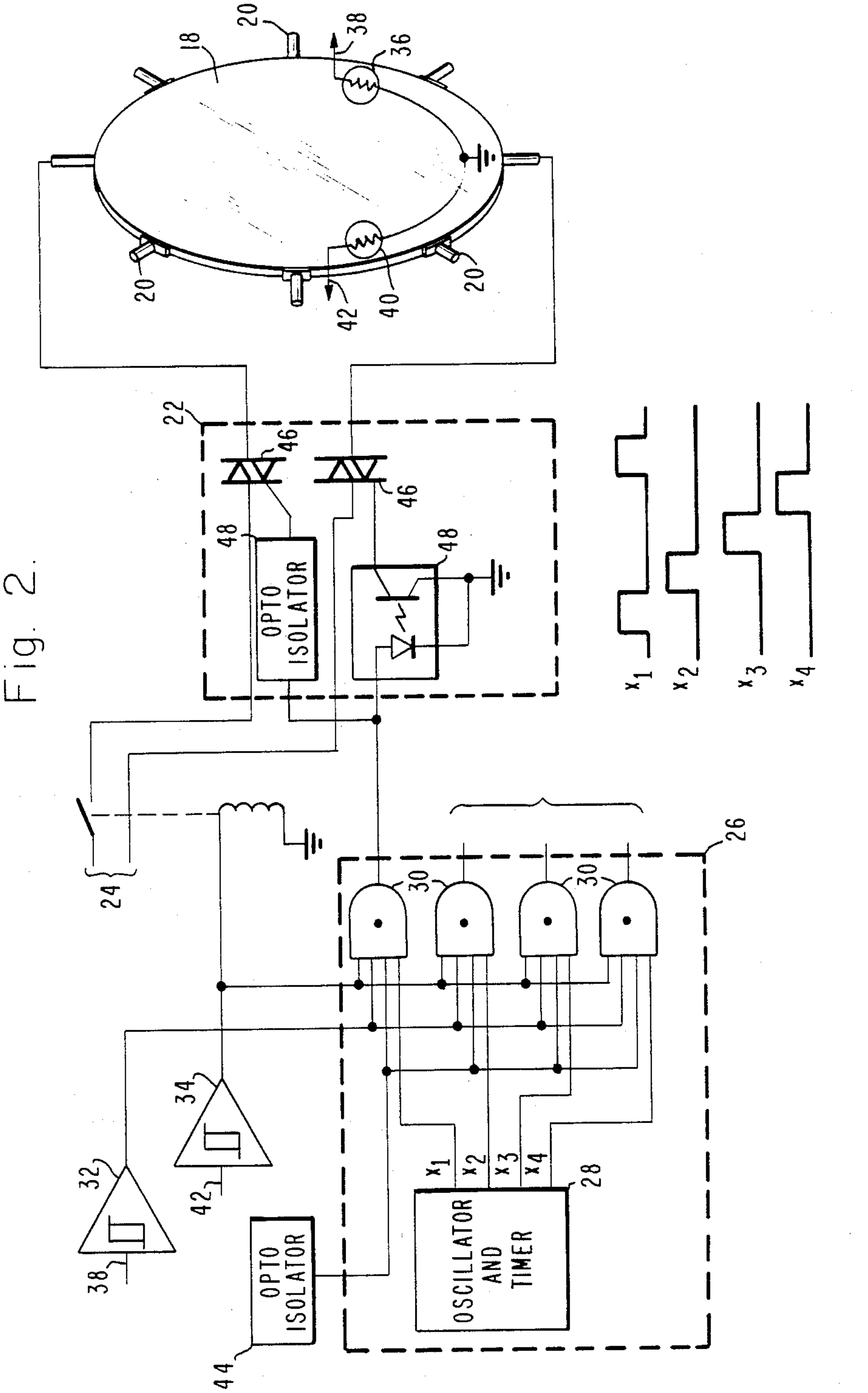
FIG. 2 is a functional block diagram of the circuit arrangement connected to a window for uniform heating thereof.

A typical arrangement for supplying the electric current to the electrodes is depicted in FIG. 2. The circuit arrangement is coupled to diametrically opposed electrodes 20. While this is the preferred arrangement, it is not necessary that the connected electrodes be diametrically opposed, if the desired or thermal pattern in window 18 has different requirements. In the preferred arrangement, each opposed pair of electrodes 20 has its own power switching mechanism 22 connected thereto. Power is supplied to mechanism 22 from a source 24. Mechanism 22 is also coupled to a controller 26. The controller defines which power switching mechanism 22 is to be closed and, therefore, which electrode pair 20 is to be energized. Included within controller 26 is an oscillator and timer 28, which is coupled through a plurality of AND GATES 30, each of which is coupled to its individual power switching mechanism 22. Oscillator and timer 28 define the timed sequence of closure of the power switching mechanisms as, for example, illustrated in the accompanying waveforms X1 through X4.

Also coupled to AND GATES 30 are a voltage comparator 32 and an over-temperature control 34. The voltage comparator is coupled to a thermister 36 through a connection 38. The purpose of voltage comparator 32 is to set the upper and lower limits of temperature within window 18. Over-temperature control 34 is coupled to another thermister 40 on window 18 through a connection 42. Overtemperature control 34 is designed to prevent any runaway temperatures which might exist within window 18 in the event that voltage comparator 32 does not function. Coupled also to controller 26 and to each of AND GATES 30 is an opto-isolator 44 which is an isolation "on-off" switch.

Power switching mechanism 22 is of conventional design and includes a pair of solid state relays 46 with a pair of opto-isolators 48, respectively coupled to the pairs of electrodes.

In operation, oscillator and timer 28 provide pulses of any preset duration, herein shown by curves X1–X4, as being one quarter of the time. However, it is to be understood that any timing period may be utilized in order to obtain the desired thermal results in window 18. Depending upon the timing pulse from oscillator and timer 28, the signal is sent through one of AND GATES 30 and from thence to appropriate power switching mechanism 22. Operation of each AND GATE is dependent upon "on-off" signals from opto-isolator 44, voltage comparator 32, over-temperature control 34 and oscillator-timer 28. If any one is not in an "on" condition, the signal from oscillator and timer 28 will not be permitted to pass through its AND GATE 30 to thereby cause power switching mechanism 22 to close and permit power from power source 24 to energize the appropriate electrode pair 20.

Figure 3:
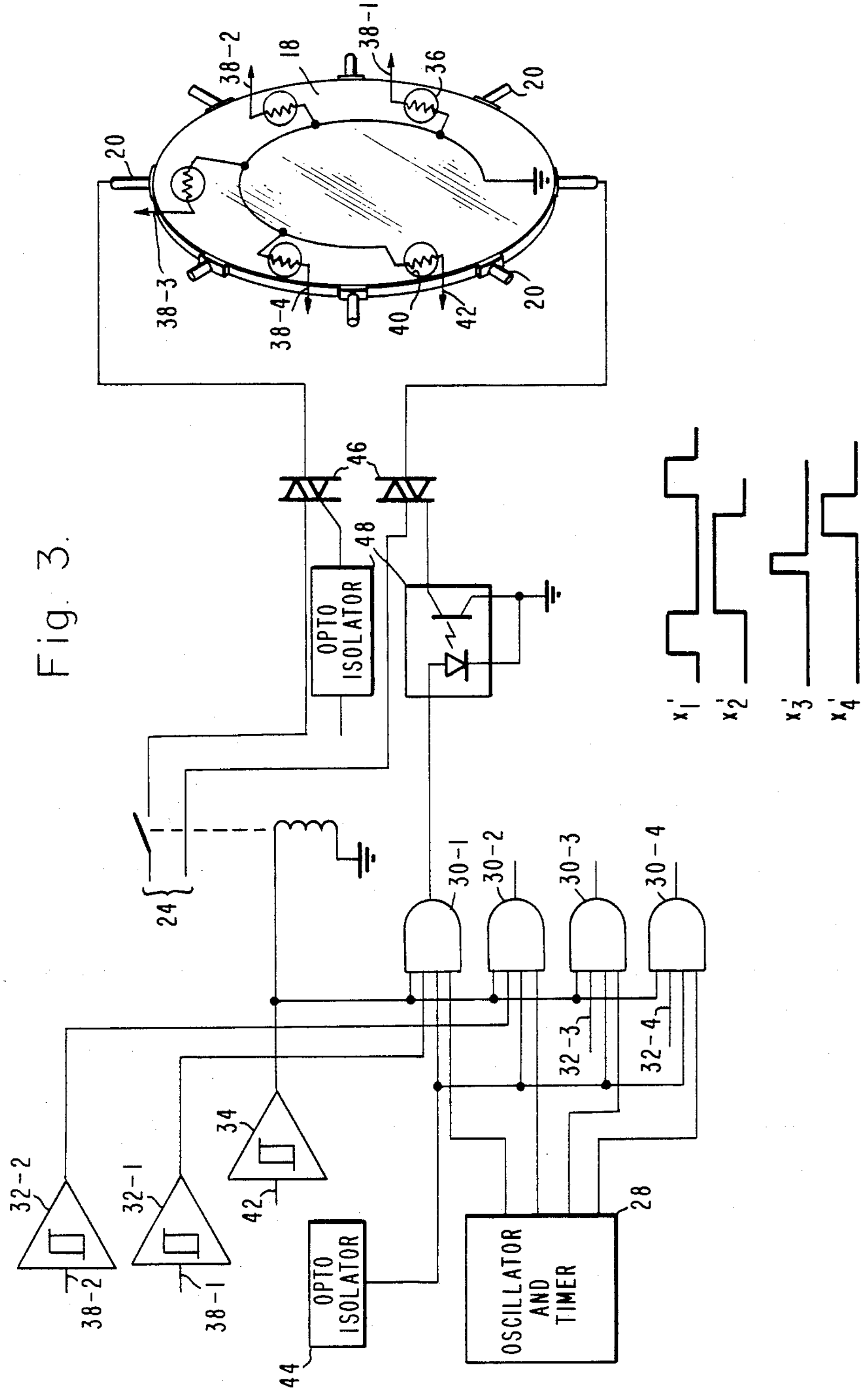
FIG. 3 is a functional block diagram of a second circuit arrangement.

An alternative embodiment of the FIG. 2 arrangement is depicted in FIG. 3 in which all the components are the same, with the exception of independent voltage regulators 32-1, 32-2, etc., respectively for each of AND GATES 30-1 through 30-4. Each of voltage comparators 32-1 through 32-4 are coupled to their respective thermisters 36-1 through 36-4 on the window. The purpose of having individual voltage comparators and thermisters is to provide greater flexibility in the event that it desired that any electrode pair be operated at different temperature ranges.

Figure 4:
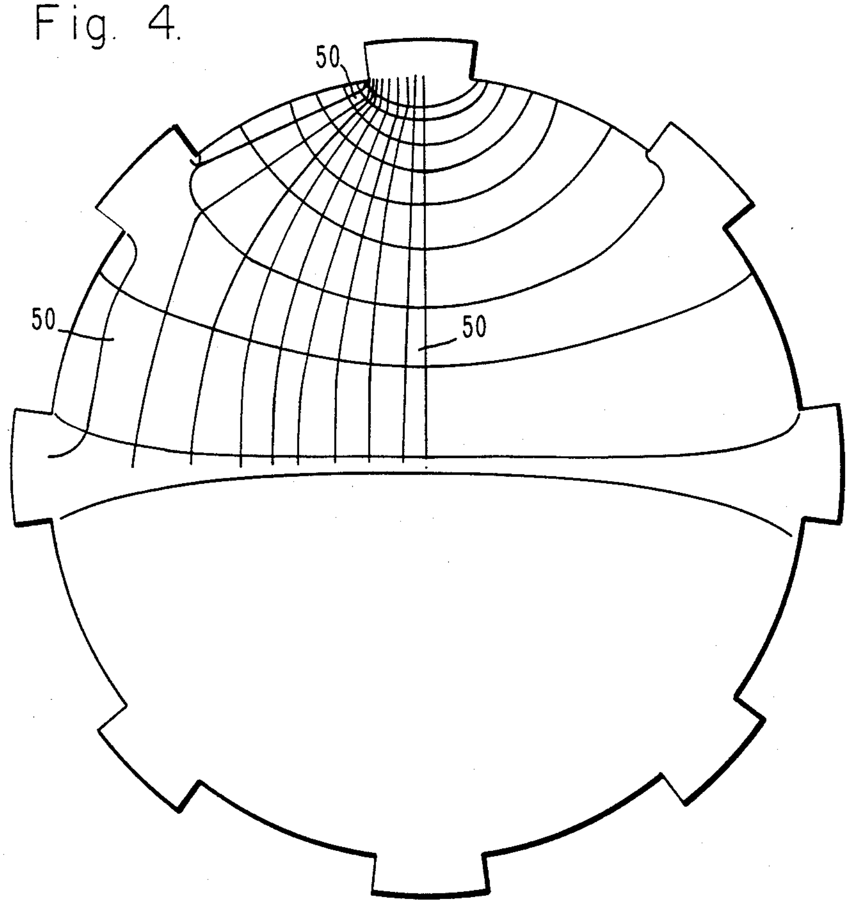
FIG. 4 is a graphic representation of a cross-sectional pattern on a window represented by some curvilinear squares, in which each square represents equal heat dissipation, for one pair of the electrodes depicted in FIG. 1 during the time they are energized.

Heating of a window may be understood with respect to FIG. 4 in which it is shown some of the curvilinear squares, denoted by indicium 50, for a particular arrangement of small electrodes. This pattern is taken from an actual experiment using conductive paper to simulate the electrical conductivity of doped single crystal germanium. Two effects are discernable from the diagram. First, because each square has equal heat dissipation, it can be seen that the dissipation is highest near the energized electrodes, next highest in the center, and lowest at the sides. Secondly, shorting at the unused electrodes can also be observed. Thus, by chosing the correct number of electrodes along with their size and spacing, it is possible t achieve a more uniform heating, including the accounting for lateral conduction losses into the mount.

Although the invention has been described with reference to particular embodiments thereof, it should be realized that various changes and modifications may be made therein without departing from the spirit and scope of the invention.

What is claimed is:

1. Apparatus for heating an optically transmissive or reflective device of electrically and thermally conductive material in a predetermined thermal pattern comprising means positioned at selected points on the device and electrically coupled thereto, and means electrically coupled to said positioned means for periodically enabling individual consistent portions of the device to be separately heated in accordance with the predetermined thermal pattern.

2. For use with an optically transmissive or reflective device which is constituted with an inherent non-uniform thermal distribution , an apparatus for heating the device in a predetermined thermal pattern comprising:

means for configuring the predetermined thermal pattern as a generally uniform thermal pattern;

means positioned at selected points on the device; and means coupled to said positioned means in an arrangement for redefining and thereby for conforming the inherent non-uniform thermal distribution of the device to the generally uniform thermal pattern for periodically enabling the device to be heated in accordance with the predetermined thermal pattern.

3. Apparatus for heating an optically transmissive or reflective device in a predetermined thermal pattern, in which the device includes semiconductive material, comprising:

electrodes positioned at selected points on the device; and means coupled to said positioned electrodes for passing current through the device and thereby for periodically enabling the device to heat itself in accordance with the predetermined thermal pattern, said enabling means including a power supply, a power switching mechanism coupling said power supply to respective ones of said electrodes, and a timing mechanism coupled to and periodically actuating said power switching mechanism for establishing the heating period among said electrodes.

4. Apparatus for heating an optically transmissive or reflective device of semiconductive material having a periphery extending about a central portion, in a predetermined thermal pattern, comprising:

electrodes arranged in pairs with each pair positioned about and on opposite sides of the device periphery; and means coupled to said electrode pairs to cause seriatim energization thereof about the device periphery for passing electric current through the device and thereby for periodically enabling the device to heat itself in accordance with the predetermined thermal pattern.

5. Apparatus according to claim 4 in which said device comprises single crystal germanium material having a substantially circular periphery and a generally uniform thickness, and said electrode pairs are positioned generally equidistantly about the periphery.

6. Apparatus according to claim 5 in which temperature sensing means are coupled to said device at selected positions thereon, and said enabling means further includes a voltage comparator coupled to said electrodes through said power switching mechanism and to said temperature sensing means to establish the temperature range of electrode energization.

7. Apparatus for heating, in a predetermined thermal pattern, an optically transmissive or reflective device of single crystal geranium material having a generally uniform thickness and a substantially circular periphery extending about a central portion comprising:

electrodes arranged in pairs with each pair positioned generally equidistantly about and on opposite sides of said device periphery:

temperature sensing means coupled to said device at selected positions thereon; and means coupled to said electrode pairs to cause seriatim energization thereof about the device periphery for periodically enabling the device to be heated in accordance with the predetermined thermal pattern, said enabling means including a voltage comparator coupled to said electrodes through a power switching mechanism and to said temperature sensing means to establish the temperature range of electrode energization; and a second voltage comparator coupled to said electrodes through said power switching mechanism and to said temperature sensing means to establish an upper temperature limit on said device against possible thermal runaway conditions therein.

8. Apparatus according to claim 6 in which said enabling means further includes AND gates having inputs coupled to said voltage comparators and said timing mechanism and outputs coupled to individual pairs of said electrodes through said power switching mechanism.

9. Apparatus for heating an optically transmissive or reflective device of electrically and thermally conductive material in a predetermined thermal pattern comprising:

electrode means positioned at selected points on the device;

temperature sensing means coupled to said device at selected positions thereon; and means coupled to said electrode means for periodically enabling the device to heat itself in accordance with the predetermined thermal pattern, said enabling means including voltage comparators coupled to respective ones of said selectively positioned means and said temperature sensing means for establishing temperature ranges for respective ones of said selectively positioned means.

10. A method for heating optically transmissive and reflective devices of material having a bulk resistance according to a predetermined thermal pattern, comprising the steps of:

selectively positioning heat producing means at several positions on one such device; and periodically energizing each of the heat producing means in conformance with the thermal pattern for causing the bulk resistance of the device to heat the material thereof.

11. A method according to claim 10 in which the device has an intrinsic non-uniform thermal distribution, further comprising the step of conforming said periodic energizing step to energize the several heat producing means for uniformly heating the device.

12. Apparatus for heating an optically transmissive or reflective device of semiconductive material having a periphery extending about a central portion, in a predetermined pattern, comprising:

electrodes arranged in pairs with each pair positioned about and on opposite sides of said device periphery;

temperature sensing means coupled to said device at selected positions thereon; and means coupled to said electrode pairs to cause seriatim energization thereof about the device periphery for periodically enabling the device to be heated in accordance with the predetermined thermal pattern, said enabling means including a voltage comparator coupled to said electrodes through a power switching mechanism and to said temperature sensing means to establish the temperature range of electrode energization, and a second voltage comparator coupled to said electrodes through said power-switching mechanism and to said temperature sensing means to establish an upper temperature limit on said device against possible thermal runaway conditions therein.

* * * * *